March 4, 1941.  E. B. MALLORY  2,233,792
SETTLING AND GRIT REMOVING APPARATUS
Filed March 28, 1938　　2 Sheets-Sheet 1
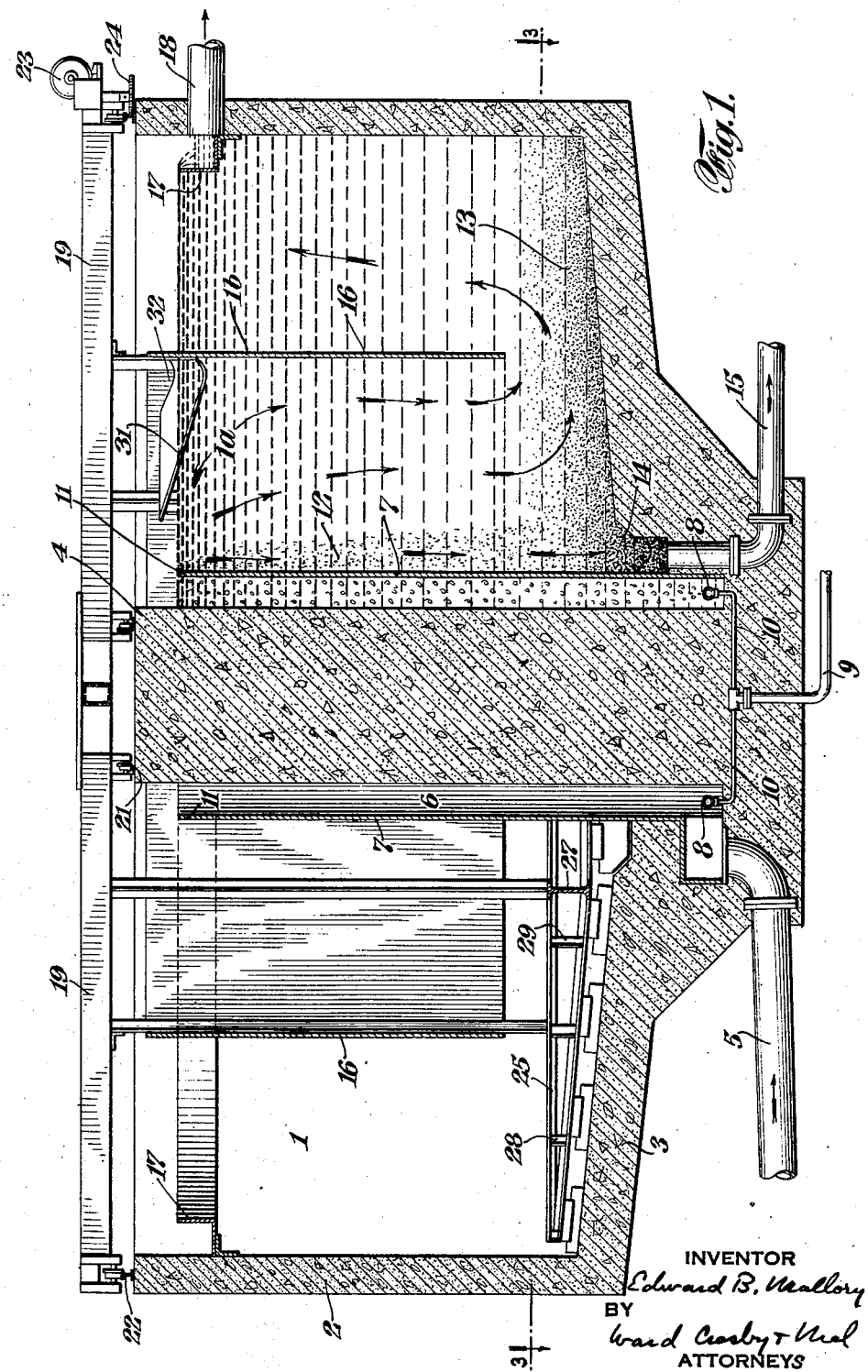

March 4, 1941.  E. B. MALLORY  2,233,792
SETTLING AND GRIT REMOVING APPARATUS
Filed March 28, 1938   2 Sheets-Sheet 2
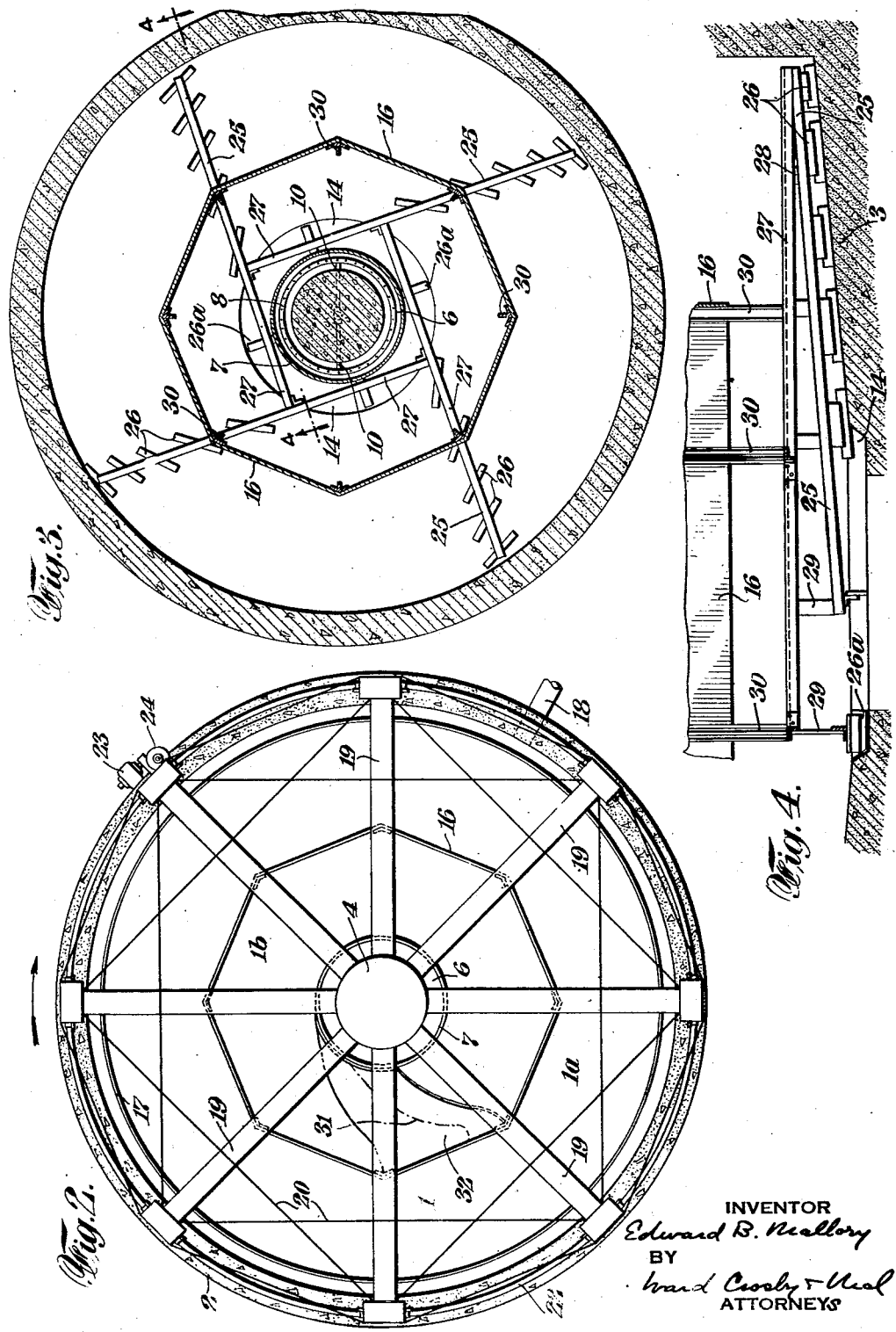
INVENTOR
Edward B. Mallory
BY
Ward Crosby & Neal
ATTORNEYS Patented Mar. 4, 1941

2,233,792

UNITED STATES PATENT OFFICE 2,233,792

SETTLING AND GRIT REMOVING APPARATUS

Edward B. Mallory, Tenafly, N. J.

Application March 28, 1938, Serial No. 198,396

6 Claims. (Cl. 210—3)

In the purification of sewage and similar waste liquors, so-called primary settling tanks have been used for many years, into which the incoming raw sewage was fed and wherein the readily settleable solids were settled out to form a sludge blanket in the lower portion of the settling chamber, the liquid components of the sewage and such solid and colloidal matter as was not thus settled out being conducted away from the upper portion of the primary settling tank for further treatment. The effluent from a primary settling tank of the above character has been found to contain an objectionable amount of sand and similar grit, the presence of which is undesirable during subsequent treatments, and accordingly it has been frequently found desirable as a part of the so-called primary treatment, to first pass the sewage through a special apparatus separate from the primary settling chamber, for the purpose of removing grit therefrom.

One of the principal causes of the presence of grit in the effluent of a primary settling chamber, is the buoyancy of organic matter adsorbed on the surface of the grit particles. This organic matter may be dislodged by violent agitation, a principle which is now available in practice by the use of apparatus separate from and additional to the primary settling tank, which is especially provided for grit removing purposes. Thus the grit so removed by such additional apparatus has to be handled separately from the sludge removed in the primary settling chamber and separately conveyed to a point of disposal.

Substantial amounts of the grease components of raw sewage are similarly adsorbed on grit and sludge particles, which grease should be removed from the primary effluent. Separate agitating or aerating apparatus has also been heretofore used to augment the separation of such grease components.

In accordance with the present invention the grit is separated from its adsorbed organic matter by devices which form a constituent part of the primary settling apparatus, and the grit is precipitated and collected along with the sludge normally settling in the primary chamber. Thus the grit is delivered to the point of disposal with the primary sludge, eliminating the additional apparatus heretofore required for the separate treatment, conveyance and disposal of the grit. At the same time grease components of the raw sewage are separated from the grit and sludge particles, and removed from within the primary settling apparatus, thus eliminating the need for separate grease removing apparatus.

Further objects and advantages of the invention will be in part obvious and in part specifically referred to in the description hereinafter contained which, taken in conjunction with the accompanying drawings, discloses the invention as carried out by an apparatus of preferred construction; in its broader aspects, however, it should be understood that the invention is not confined to apparatus of the disclosed form, and also that the invention in its broader aspects may be used in the treatment of grit or grease containing liquids other than sewage, so long as the conditions of operation and steps performed are analogous, and within the scope permitted by the prior art. In the drawings—

Fig. 1 is a central vertical section through an apparatus constructed to operate in accordance with the invention.

Fig. 2 is a top plan view of the apparatus shown in Fig. 1.

Fig. 3 is a section on line 3—3 of Fig. 1.

Fig. 4 is a section on line 4—4 of Fig. 3.

Raw sewage as it enters a primary settling tank contains readily settleable sludge or other solids which are collected in and removed from the lower portion of the settling tank, as well as a certain amount of sludge which is not thus settled out but which is carried along with the sewage liquids to be removed by subsequent treatment. The sewage entering the primary settling tank also usually contains a certain amount of sand or grit which is not readily separable from the sludge particles which are carried along by the sewage liquids leaving the tank above described, and since the presence of this grit is objectionable in subsequent stages of treatment it has been heretofore removed by the use of a separate intermediate apparatus specially designed for the purpose.

In accordance with the present invention the raw sewage entering the settling tank is subjected to the action of air under pressure, and to an agitation and aerating effect which causes the sand and similar grit particles to become separated from the sludge particles which are of such nature as to pass out of the settling tank with the sewage liquids. The air stream, applied to the raw sewage entering the settling tank as above mentioned, assists in carrying the grit particles (after being separated as above described) along into the settling tank, after which the grit rapidly precipitates because of its greatly increased specific gravity when dissociated from the buoyant adsorbed organic particles and is consolidated with the readily removable settled sludge and other solids, which form a blanket in the bottom of the primary settling chamber, and may all be removed from the chamber together. The above treatment is to be distinguished from the aeration of sludge containing sewage as a part of the activated or oxidized sludge process, for example, wherein the air is applied for other purposes to sewage from which the grit has already been removed. The aerating step of the present invention also assists materially in removing grease from the sewage during its passage through the primary settling chamber, the grease being thereby caused to separate more effectively and form on the surface of the liquid within the chamber, from which point it may be skimmed off as needed. Preferably the incoming raw sewage is caused to pass in an upwardly directed path of travel into the upper portion of the primary settling chamber, and the air under pressure above described is injected into the incoming sewage while so traveling upwardly; in this way the sludge particles agglomerated with the grit will be dislodged and the air stream will assist in delivering the grit particles into the upper portion of the settling chamber, after which they will rapidly precipitate down into the primary sludge blanket as above described.

The invention is disclosed as applied to settling and grit-removing apparatus having a settling chamber 1 preferably approximately circular in cross section and provided with an enclosing wall 2 and floor 3. In the illustrated form the apparatus is provided with a central supporting pillar 4 (for purposes later to be described), and the raw sewage to be treated comes in through an intake pipe 5 to one or more upwardly directed intake chambers or conduits 6 which surround the pillar 4 and deliver into the upper level of settling chamber 1. As shown the intake chamber 6 is enclosed by a cylindrical shell 7 which surrounds and is spaced from the pillar 4.

Air under pressure may be applied to the raw sewage traveling upwardly through chamber 6 by means of diffusers 8 located near the bottom of chamber 6 and receiving air under pressure from pipes 9 and 10. The resulting rising column of air bubbles will thoroughly agitate and aerate the grit containing particles as above referred to, and will permeate substantially the entire cross sectional area of the liquid column in said intake chamber, thereby causing the grit containing particles to be separated out as above described, and to pass upwardly and into the settling chamber 1 over the lip 11 at the top of shell 7.

The separated grit, being relatively heavy, will settle down quite rapidly along the outer wall of shell 7, as indicated by the dotted portions 12, until it becomes a part of the sludge blanket 13 which occupies the bottom portion of chamber 1. The sludge and grit may be removed through an annular sump 14 surrounding the lower end of shell 7 and connected to an offtake pipe 15.

The aerating step above described also has a substantial de-greasing effect on the incoming sewage, the grease being thereby caused to float on the surface of the liquid contained within chamber 1, from which point it may be removed by a suitable grease collector. I prefer to use in connection with the settling chamber 1 a downwardly extending curtain wall 16 which (among other functions) separates the zone of the surface of the liquid into which the grease is delivered, from the portion of the chamber from which the sewage is withdrawn. In the illustrated apparatus the curtain wall 16 is of general annular shape and concentric with enclosing wall 2 and pillar 4, thus providing in connection with settling chamber 1 an inner compartment 1a and outer compartment 1b which communicate at the bottom of the settling chamber. The deposit of solids in the blanket 13 is thereby promoted, the liquids being filtered to some extent through the blanket, after which they pass upwardly into the compartment 1b from which they may be suitably withdrawn at an upper level, flowing for example over an annular lip 17 connected to an effluent pipe 18.

Aeration of the raw sewage solids passing into the setting chamber prolongs the time the settled sludge may remain in the sludge blanket without becoming septic. This permits a deeper sludge blanket and filtering medium of greater capacity and improved efficiency.

The disclosed apparatus is provided with an overlying supporting structure rotatably supported upon the annular outer wall 2 and central pillar 4, which carries the curtain wall 16 above described, as well as suitable sludge collecting mechanism for assisting in conducting the sludge from blanket 13 to the sump 14. In the shown form this supporting structure includes a plurality of beams 19 radiating outwardly from a central point above pillar 4, and suitably connected together and braced and which need not be described in detail. The supporting structure thus constituted is rotatably mounted upon circular rails 21 and 22 carried respectively by central pillar 4 and outer wall 2. A suitable motor 23 and gearing 24 may be provided to rotate the supporting structure, but these parts of the apparatus will not be described in detail since appropriate mechanisms for such a purpose are known in the art.

As shown the sludge collecting mechanism consists of a plurality of arms 25 carrying scraper blades 26 which are instroking in their action and work over the floor 3 (which latter is inclined downwardly toward the central sump 14) in such manner as to stroke the sludge progressively toward its outlet from the settling chamber. The arms 25 are suspended from the radiating beams 19 by means of suitable intermediate connecting and bracing members such as the horizontal beams 27, located respectively above arms 15 and connected thereto by short angle-pieces 28 and 29 (Fig. 5), the inner end portions of the beams 27 being joined together so as to surround the central pillar 4, as shown in Fig. 3. These inner portions may also carry supplementary scraper blades 26a operating in the sump 14 as shown in Fig. 3. The structure constituted by the beams 27 above described may be suspended from the radiating beams 19 by means of angle shaped uprights 30 (Figs. 3 and 5) connected to the beams 27 at their lower ends and respectively to the beams 19 at their upper ends. Thus the uprights 30 in conjunction with the horizontal beams 27 make up a relatively strong and well braced structure through which rotary motion may be imparted to the scraper blades 26 and 26a. In a construction of the character above described, the curtain wall 16 may be readily provided by fastening steel plates to the uprights 30, these plates in the illustrated form of the invention extending down nearly to the level of the horizontal beams 27 (Fig. 5).

For the purpose of collecting grease from the surface of the liquid, which is partitioned off by curtain wall 16, a rotary arm 31 may be provided (Fig. 2) the illustrated shape of arm serving to collect the grease at a point 32 on the arm, from which the grease may be removed by a suitable scoop.

While the invention has been disclosed as carried out by an apparatus of the above described specific construction, it should be understood that from the standpoint of the invention in its broader aspects, many changes may be made therein without departing from the invention within the scope of the appended claims.

I claim:

1. Settling and grit-removing apparatus for the primary treatment of grit containing sewage and the like, including a settling chamber, an intake chamber extending upwardly to deliver grit containing sewage or the like into the upper portion of said settling chamber, means for introducing air under pressure into the lower portion of said intake chamber, said means being constructed and arranged to cause air bubbles to pass upwardly through substantially the entire cross sectional area of the liquid column in said intake chamber, to agitate the incoming sewage, separate grit from other particles therein and carry grit particles so separated into said settling chamber, means affording removal of grit and sludge from the lower portion of said settling chamber, and an effluent conduit for the sewage liquids leading from the upper portion of said settling chamber.

2. Settling and grit-removing apparatus for the primary treatment of grit containing sewage and the like, including a settling chamber, an intake chamber delivering into the upper portion of said settling chamber, means for introducing air under pressure into said intake chamber, said means being constructed and arranged to cause air bubbles to pass upwardly through substantially the entire cross sectional area of the liquid column in said intake chamber, to agitate the incoming sewage, separate grit from other particles therein and carry the grit particles so separated into said settling chamber, means affording removal of grit from the lower portion of said settling chamber, an effluent conduit for the sewage liquids leading from the upper portion of said settling chamber, and a grease collecting device operating in the upper portion of said settling chamber.

3. Settling and grit-removing apparatus for the primary treatment of grit containing sewage and the like, including a settling chamber, an intake chamber extending upwardly to deliver grit containing sewage or the like into the upper portion of said settling chamber, means for introducing air under pressure into the lower portion of said intake chamber, said means being constructed and arranged to cause air bubbles to pass upwardly through substantially the entire cross sectional area of the liquid column in said intake chamber, to agitate the incoming sewage, separate grit from other particles therein and carry grit particles so separated into said settling chamber, means affording removal of grit and sludge from the lower portion of said settling chamber, an effluent conduit for the sewage liquids leading from the upper portion of said settling chamber, a curtain wall surrounding the delivery end of said intake chamber and projecting downwardly to a lower level in said settling chamber, and a grease collecting device operating in the upper portion of the settling chamber within said curtain wall.

4. The method of removing and settling grit from raw sewage which includes passing grit containing sewage upwardly and delivering the same into the upper portion of a primary settling chamber, introducing air under pressure into the upwardly traveling incoming sewage to cause air bubbles to pass upwardly through substantially the entire cross sectional area of said upwardly traveling incoming sewage, thereby to agitate said incoming sewage, separate grit from other particles therein and carry said separated grit particles into the upper portion of the settling chamber, settling the separated grit particles and sludge in the lower portion of the settling chamber, removing said grit particles and sludge from the lower portion of said chamber, and withdrawing sewage liquids from the upper portion of said chamber.

5. The method of removing and settling grit from raw sewage which includes passing grit and grease containing sewage upwardly and delivering the same into the upper portion of a primary settling chamber, introducing air under pressure into the upwardly traveling incoming sewage to cause air bubbles to pass upwardly through substantially the entire cross sectional area of said upwardly traveling incoming sewage, thereby to agitate said incoming sewage, separate grit from other particles therein and carry said separated grit particles into the upper portion of the settling chamber, settling the separated grit particles and sludge in the lower portion of the settling chamber, removing said grit particles and sludge from the lower portion of said chamber, withdrawing sewage liquids from the upper portion of said chamber and removing grease from the upper portion of said chamber.

6. Settling and grit and grease removing apparatus for the primary treatment of grit and grease containing sewage and the like including a settling chamber, an intake chamber centrally disposed in said chamber and extending upwardly therein to deliver grit and grease containing sewage and the like into the upper portion of said settling chamber, means for introducing air under pressure into the lower portion of said intake chamber, said means being constructed and arranged to cause air bubbles to pass upwardly through substantially the entire cross sectional area of the liquid column in said intake chamber, to agitate the incoming sewage, separate grease and grit from the particles therein and carry such grease and grit particles so separated into said settling chamber, a curtain wall surrounding said intake chamber and projecting downwardly into said settling chamber, an angularly movable structure carrying said curtain wall, a grease collecting device operating in the upper portion of said chamber within said curtain wall and also carried by said structure, means affording removal of grit and sludge from the lower portion of said settling chamber, and an effluent conduit for the sewage liquids leading from the upper portion of said settling chamber outside of said curtain wall.

EDWARD B. MALLORY.